United States Patent Office 3,109,020
Patented Oct. 29, 1963

---

3,109,020
POLYNITRO-NITRAZA-CARBAMATES AND
METHOD OF PREPARING SAME
Milton B. Frankel, Pasadena, Calif., assignor to Aerojet-
General Corporation, Azusa, Calif., a corporation of
Ohio
No Drawing. Filed June 9, 1955, Ser. No. 514,382
21 Claims. (Cl. 260—482)

This invention relates to new compositions of matter and a method for their preparation. In particular, it relates to polynitro-nitraza-carbamates having the general formula:

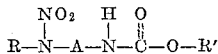

wherein R and R' are alkyl or nitroalkyl radicals and A is an alkylene radical.

The compounds of this invention are prepared by condensing polynitro-nitraza-isocyanates with nitroalcohols, in accordance with the general reaction scheme set forth below:

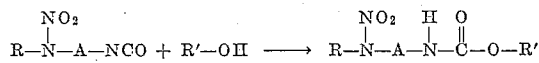

wherein R, R' and A are as defined above.

As a matter of convenience, the reaction is usually conducted at reflux temperatures. While the reaction can be performed at lower temperatures, the reaction rate is usually too slow for convenient laboratory applications, while at higher temperatures, the reaction is difficult to control. The reaction is preferably, although not necessarily, conducted in the presence of a condensation catalyst such as ferric acetylacetonate. Increased smoothness and control of the reaction are achieved when the reaction is conducted in an inert organic solvent such as chloroform.

The isocyanates used as starting materials in the practice of this invention are prepared by reacting a corresponding acid halide with sodium azide and subsequently heating the resultant organic azide under anhydrous conditions to effect rearrangement, as disclosed in my copending application Serial No. 514,384, filed concurrently with the present application.

The nitroalcohols used as starting materials are prepared by condensing nitronate salts of alkanes with formaldehyde to produce alcohols such as 2,2,2-trinitroethanol and 2,2-dinitropropanol, or with an unsaturated acid such as acrylic acid, as described in the J. Org. Chem., vol. 16, pp. 161–4, 1951, to produce nitroacids, the acid halides of which can be reduced with sodium borohydride to nitroalcohols, as disclosed in assignee's copending application Serial No. 392,471, filed November 16, 1953.

To more clearly illustrate my invention, the following examples are presented. It should be understood, however, that these examples are presented merely as a means of illustration and are not intended to limit the scope of th invention in any way.

EXAMPLE I

Preparation of N-(2-Nitraza-4,4-Dinitropentyl)-2,2,2-Trinitroethyl Carbamate

Equivalent quantities of 2-nitraza-4,4-dinitropentyl iso- cyanate and 2,2,2-trinitroethanol were refluxed in chloroform with a catalytic amount of ferric acetylacetonate for eight hours. The solution was then evaporated to dryness in vacuo leaving a quantitative yield of a yellow oil, N-(2-nitraza-4,4-dinitropentyl) - 2,2,2 - trinitroethyl carbamate.

EXAMPLE II

Preparation of N-(3-Nitrazabutyl)-2,2,2-Trinitroethyl Carbamate

In a 500 ml. round-bottom flask, fitted with a reflux condenser and drying tube, was placed 19.0 gm. (0.13 mole) of 3-nitrazabutyl isocyanate, 23.7 gm. (0.13 mole) of 2,2,2-trinitroethanol, 200 ml. of dry chloroform, and a trace of ferric acetylacetonate. The solution was refluxed for 3.5 hours and concentrated in vacuo to give a quantitative yield of white solid. Recrystallization from chloroform gave white prisms, M.P. 98–99° C. The elemental analysis of the product was as follows.

Calculated for $C_6H_{10}N_6O_{10}$: percent C, 22.09; percent H, 3.09. Found: percent C, 22.06; percent H, 3.06.

EXAMPLE III

Preparation of N-(2-Nitraza-4,4-Dinitrobutyl) Ethyl Carbamate

A solution of 1.6 gm. (0.024 mole) of sodium azide in 25 ml. of water was placed in a 300 ml. 3-necked flask, fitted with a mechanical stirrer, dropping funnel and thermometer. The flask was cooled in an ice bath and a solution of 3.3 gm. (0.012 mole) of 3,5,5-trinitro-3-aza-hexanoyl chloride in 25 ml. of acetone was added, keeping the temperature below 10° C. A solid precipitated initially but gradually dissolved. After the addition was complete, the reaction mixture was stirred for an additional 30 minutes and extracted with chloroform. The extracts were combined, washed with water, dilute sodium bisulfate, and water, and dried over sodium sulfate for 1 hour. The chloroform solution was distilled, first under vacuum at room temperature and then at the boiling point without vacuum, keeping the volume constant by the addition of dry, alcohol-free chloroform. This procedure ensured the complete removal of water. The distillation was continued until the evolution of gas had ceased; 25 ml. of methanol was then added, and the solution was refluxed for 4 hours. The solution was concentrated in vacuo, leaving a yellow oil which was crystallized from isopropyl alcohol, giving 0.8 gm. of white solid, M.P. 93–100° C. A second recrystallization from isopropyl alcohol raised the melting point to 100–102° C. The elemental analysis of the product was as follows.

Calculated for $C_6H_{11}N_5O_8$: percent C, 25.63; percent H, 3.94; percent N, 24.91. Found: percent C, 25.75; percent H, 3.81; percent N, 24.67.

EXAMPLE IV

Preparation of Methyl 3-Nitrazabutyl Carbamate 3-nitrazabutyl isocyanate (290 gm., 2 moles) was added portionwise with stirring to 250 ml. hot methanol. The resulting solution was heated at reflux temperature for an additional 30 minutes, and the excess methanol was then removed by distillation under reduced pressure. The residue was recrystallized from a mixture of 150 ml.

chloroform and 2 liters carbon tetrachloride, including a Nuchar treatment. The yield was 301 gm. (85%) methyl 3-nitrazabutyl carbamate, melting at 86–87° C. The analytical sample, prepared by a second recrystallization, melted at 88.5° C. Elemental analysis of the product was as follows.

Calculated for $C_5H_{11}O_4N_3$: percent C, 33.90; percent H, 6.26; percent N, 23.72; percent $OCH_3$, 17.52. Found: percent C, 33.83; percent H, 6.16; percent N, 23.49; percent $OCH_3$, 16.96.

A wide variety of polynitro-nitraza-carbamates can be prepared in accordance with the procedure set forth in the above examples. N-(3-nitrazabutyl)-3,3-dinitrobutyl carbamate is prepared by condensing 3-nitrazabutyl isocyanate with 3,3-dinitrobutanol; N-(2-nitraza-4,4-dinitropentyl)-2,2-dinitropropyl carbamate is prepared by condensing 2-nitraza-4,4-dinitropentyl isocyanate with 2,2-dinitropropanol; and N-(2-nitraza-4,4,4-trinitrobutyl)-2,2,2-trinitroethyl carbamate is prepared by condensing 2-nitraza-4,4,4-trinitrobutyl isocyanate with 2,2,2-trinitroethanol.

Any member of this series of polynitro-nitraza-carbamates can be prepared by condensing an appropriate polynitro-nitrazaisocyanate with a nitro-containing alcohol, in accordance with the teachings of this invention.

The carbamates having comparatively low oxygen content, namely those containing no nitro groups, other than those attached to aza groupings, are not particularly good explosives, however, these compounds find valuable use as ballistic modifiers and can be mixed with conventional high explosives such as T.N.T., RDX and the like to decrease their sensitivity. The amounts used depend upon the explosive power and sensitivity needed. These modifiers are particularly useful in combination with explosives having a positive oxygen balance. Included in this group are such compounds as methyl-3-nitrazabutyl carbamate, butyl-3-nitrazabutyl carbamate, ethyl-4-nitrazapentyl carbamate, methyl-4-nitrazaheptyl carbamate, etc., all of which can be prepared in accordance with the invention.

The nitro compounds of this invention are useful as high explosives and can be used in any conventional explosive missile, projectile, rocket, or the like, as the main explosive charge. An example of such a missile is disclosed in United States Patent No. 2,470,162, issued May 17, 1949. One way of using the high explosives of this invention in a device such as that disclosed in United States Patent No. 2,470,162, is to pack the crystalline explosive in powder form into the warhead of the missile. Alternatively, the crystals can be first pelletized and then packed. A charge thus prepared is sufficiently insensitive to withstand the shock entailed in the ejection of a shell from a gun barrel or from a rocket launching tube under the pressure developed from ignition of a propellant charge, and can be caused to explode on operation of an impact- or time fuse-mechanism firing a detonating explosive such as lead azide or mercury fulminate.

The compounds of this invention readily undergo reaction with nitric acid to produce valuable nitraza esters, as more fully disclosed in applicant's copending application Serial No. 514,381, filed concurrently with this application. The nitraza esters thus obtained possess explosive power and properties superior to the compounds of the present invention and can be used as a military or blasting explosive by the methods described above.

I claim:

1. As new compositions of matter, polynitro-nitraza-carbamates having the general formula:

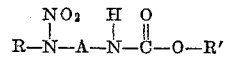

wherein R and R' are radicals selected from the group consisting of lower alkyl and lower nitroalkyl radicals and A is a lower alkylene radical.

2. As a new composition of matter, N-(2-nitraza-4,4-dinitropentyl)-2,2,2-trinitroethyl carbamate having the structural formula:

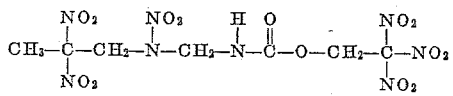

3. As a new composition of matter, N-(3-nitrazabutyl)-2,2,2-trinitroethyl carbamate having the structural formula:

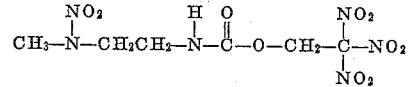

4. As a new composition of matter, N-(3-nitrazabutyl)-3,3-dinitrobutyl carbamate having the structural formula:

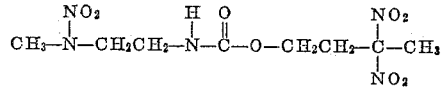

5. As a new composition of matter, N-(2-nitraza-4,4-dinitropentyl)-2,2-dinitropropyl carbamate having the structural formula:

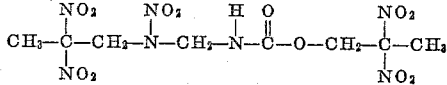

6. As a new composition of matter, N-(2-nitraza-4,4,4-trinitrobutyl)-2,2,2-trinitroethyl carbamate having the structural formula

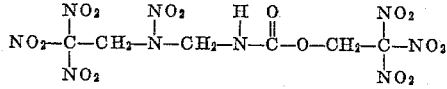

7. As a new composition of matter, N-(2-nitraza-4,4-dinitrobutyl)methyl carbamate having the structural formula:

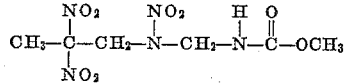

8. As a new composition of matter, methyl 3-nitrazabutyl carbamate having the structural formula:

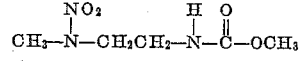

9. The method of preparing polynitro-nitraza-carbamates having the general formula:

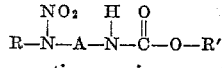

which comprises reacting an isocyanate having the general formula:

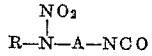

with an alcohol having the general formula:

wherein R and R' are radicals selected from the group consisting of lower alkyl and lower nitroalkyl radicals and A is a lower alkylene radical.

10. The method of claim 9 wherein the reaction is conducted in the presence of ferric acetylacetonate.

11. The method of preparing N-(2-nitraz-4,4-dinitropentyl)-2,2,2-trinitroethyl carbamate which comprises reacting 2-nitraza-4,4-dinitropentyl isocyanate with 2,2,2-trinitroethanol.

12. The method of preparing N-(3-nitrazabutyl)-2,2,2-trinitroethyl carbamate which comprises reacting 3-nitrazabutyl isocyanate with 2,2,2-trinitroethanol.

13. The method of preparing N-(3-nitrazabutyl)-3,3-dinitrobutyl carbamate which comprises reacting 3-nitrazabutyl isocyanate with 3,3-dinitrobutanol.

14. The method of claim 13 wherein the reaction is conducted in the presence of ferric acetylacetonate.

15. The method of preparing N-(2-nitraza-4,4-dinitropentyl)-2,2-dinitropropyl carbamate which comprises reacting 2-nitraza-4,4-dinitropentyl isocyanate with 2,2-dinitropropanol.

16. The method of claim 15 wherein the reaction is conducted in the presence of ferric acetylacetonate.

17. The method of preparing N-(2-nitraza-4,4,4-trinitrobutyl)-2,2,2-trinitroethyl carbamate which comprises reacting 2-nitraza - 4,4,4 - trinitrobutyl isocyanate with 2,2,2-trinitroethanol.

18. The method of claim 17 wherein the reaction is conducted in the presence of ferric acetylacetonate.

19. The method of preparing N-(2-nitraza-4,4-dinitrobutyl) methyl carbamate which comprises reacting 2-nitraza-4,4-dinitrobutyl isocyanate with methanol.

20. The method of preparing methyl 3-nitrazabutyl carbamate which comprises reacting 3-nitrazabutyl isocyanate with methanol.

21. The composition having the general formula:

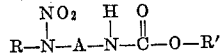

wherein R is a lower trinitro alkyl in which the nitro groups are all on the terminal carbon; R' is a nitro substituted lower alkyl radical; and A is a lower alkylene radical.

No references cited.